United States Patent Office 2,914,571
Patented Nov. 24, 1959

2,914,571
DEHYDROHALOGENATION OF HALOBICYCLO COMPOUNDS

Louis Schmerling, Riverside, Ill., assignor, by mesne assignments, to Universal Oil Products Company, Des Plaines, Ill., a corporation of Delaware No Drawing. Application April 25, 1956
Serial No. 580,469

4 Claims. (Cl. 260—648)

This application is a continuation-in-part of my copending application Serial No. 342,753, which was filed March 16, 1953, and now abandoned.

The present invention relates to methods for dehydrohalogenating certain polyhalobicyclo-olefinic compounds.

Heretofore it has been indicated that bicycloalkadienes could not be prepared by dehalogenating halobicycloalkenes obtained by the condensation of a cycloalkadiene with a haloolefin. On the other hand, partial dehalogenation of the condensation product of a halogenated cycloalkadiene, namely hexachlorocyclopentadiene, and vinyl chloride may be carried out:

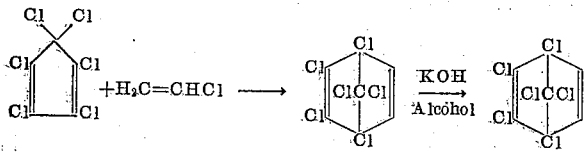

However, this dehydrochlorination reaction occurs because of the presence of the six chlorine atoms on one ring of the molecule, said chlorine atoms serving to activate the chlorine atom on the second ring. As hereinbefore stated it has been shown that the reaction product of an unhalogenated conjugated cycloalkadiene such as cyclopentadiene and a monohaloolefin will not undergo dehydrohalogenation when subjected to the operating conditions of prior processes, the single halogen atom being too inert to undergo reaction with the dehydrohalogenating agent. For example, attempts have been made, as disclosed in a paper by Roberts et al., Journal of the American Chemical Society, 72, 3329 (1950), and in Belgian Patent No. 498,176 issued to J. Hyman et al., to dehydrochlorinate 5-chlorobicyclo [2.2.1]-2-heptene to form bicyclo [2.2.1]-2,5-heptadiene. This is illustrated by the following equation:

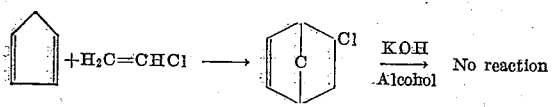

I have found that the products of the condensation of cycloalkadienes with a particular class of haloolefins contain active halogens and may be partially dehalogenated to the desired halobicycloalkadienes.

It is, therefore, an object of this invention to prepare a halobicycloalkadiene by dehydrohalogenating a polyhalobicycloalkene.

A further object of this invention is to first prepare a polyhalobicycloalkene and dehydrohalogenate the same to form a halobicycloalkadiene.

One embodiment of this invention is found in a process for the preparation of a halobicycloalkadiene which comprises reacting a conjugated cycloalkadiene with a polyhaloolefin having the general formula

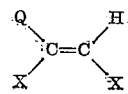

in which X is a halogen radical and Q is a radical selected from the group consisting of hydrogen, halogen, alkyl and haloalkyl radicals thereby forming a polyhalobicycloalkene containing at least one halogen atom on each of two adjacent carbon atoms, dehydrohalogenating said polyhalobicycloalkene in the presence of a dehalogenating agent to form a halobicycloalkadiene, and recovering the latter compound.

A specific embodiment of this invention resides in a process for the preparation of a halobicycloheptadiene by reacting cyclopentadiene with a polyhaloethylene containing at least one halogen atom on each of the two adjacent carbon atoms thereby forming a polyhalobicycloheptene containing at least one halogen atom on each of the two adjacent carbon atoms, dehydrohalogenating said polyhalobicycloheptene in the presence of a dehydrohalogenating agent to form a halobicycloheptadiene, and recovering the later compound.

A more specific embodiment of the invention resides in a process for preparing 2-chlorobicyclo [2.2.1]-2,5-heptadiene which comprises reacting cyclopentadiene with 1,2-dichloroethylene to form 5,6-dichlorobicyclo [2.2.1]-2-heptene, dehydrohalogenating said compound in the presence of potassium hydroxide and methanol to form 2-chlorobicyclo [2.2.1]-2,5-heptadiene, and recovering the latter compound.

Yet another specific embodiment of the invention resides in a process for preparing 2-chlorobicyclo [2.2.1]-2,5-heptadiene by dehydrohalogenating 5,6-dichlorobicyclo [2.2.1]-2-heptene in the presence of potassium hydroxide and ethanol to form 2-chlorobicyclo [2.2.1]-2,5-heptadiene, and recovering the latter compound.

Other objects and embodiments referring to alternative reactants utilizable as charging stock in the present process and to alternative dehydrohalogenating agents within the scope of the invention will be referred to in greater detail in the following further detailed description of the invention.

As hereinbefore set forth it has now been discovered that halobicycloalkadienes having the following formula:

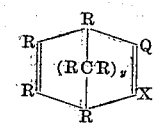

in which X represents a halogen radical, Q represents a hydrogen, halogen, alkyl or haloalkyl radical, $y$ is an integer from 1 to 4, preferably 1 or 2, and R is independently selected from the group consisting of hydrogen and alkyl radicals may be synthesized by reacting a conjugated cycloalkadiene with a polyhaloolefin having the general formula:

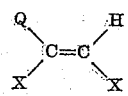

in which X represents a halogen radical and Q represents a hydrogen, halogen, alkyl or haloalkyl radical to form a polyhalobicycloalkene, and dehydrohalogenating the resulting compound thus yielding the desired halobicycloalkadiene. The reaction between the conjugated cycloalkadiene and the polyhaloolefin is a thermal condensation and occurs in the absence of any added catalyst. In addition the reactants are preferably present in a molar ratio range of from about 0.5:1 to about 0.9:1 mole of cycloalkadiene to polyhaloolefin. The excess of polyhaloolefin is preferred in order to insure the production of a bicyclic compound instead of a tetracyclic compound which may occur if the cycloalkadiene is in excess. The halobicycloalkadienes which are the desired products of the invention are useful as intermediates in the preparation of insecticides, pharmaceuticals, resins and plastics. For instance, a halobicycloalkadiene such as 2-chlorobicyclo[2.2.1]-2,5-heptadiene which may be prepared in the process of this invention may be reacted with hexachlorocyclopentadiene to form 1,2,3,4,6,10,10-heptachloro-1,4,4a,5,8,8a-hexahydro - 1,4,5,8-dimethanonaphthalene which is an effective insecticide against houseflies, Mexican bean beetles, pea aphids, etc.

When cyclopentadiene is used as a feed stock, the reaction using a 1,2-dihaloethylene will proceed according to the following equation:

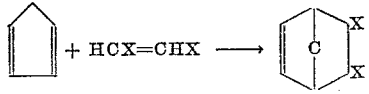

The dihalobicycloheptene will then be dehydrohalogenated by means of a dehydrohalogenating agent such as an alkali metal hydroxide and an alcohol according to the following equation to prepare the monohalobicycloheptadiene.

In the above equation X is a halogen, MOH is an alkali metal hydroxide and ROH is an alcohol.

A more specific example of the above method of preparing a halobicycloheptadiene is found in the following equations in which cyclopentadiene is reacted with 1,2-dichloroethylene and the resulting compound, comprising 5,6-dichlorobicyclo[2.2.1]-2-heptene, is dehydrohalogenated with potassium hydroxide in an ethyl alcohol medium to form the desired 2-chlorobicyclo [2.2.1]-2,5-heptadiene.

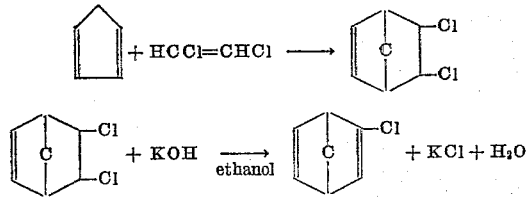

As hereinbefore stated one component of the feed stock is selected from the group of compounds consisting of conjugated cycloalkadienes, such compounds including 1,3-cyclopentadiene (hereinafter referred to as cyclopentadiene), 1,3-cyclohexadiene, 1,3-cycloheptadiene, 1,3-cyclooctadiene, etc., alkyl substituted cyclopentadienes such as 5-methylcyclopentadiene, 5-ethylcyclopentadiene, 5,5-dimethylcyclopentadiene, 1,2-dimethylcyclopentadiene, etc., 1-methyl-1,3-cyclohexadiene, 1-ethyl-1,3-cyclohexadiene, 1,2-dimethyl-1,3-cyclohexadiene, 1,3-dimethyl-1,3-cyclohexadiene, 1,2-diethyl-1,3-cyclohexadiene, etc. Cyclopentadiene and alkyl substituted cyclopentadienes are the preferred reactants in this process due to their relatively greater availability and because they yield a preferred type of bicycloalkadiene.

The polyhaloolefin compound which, as hereinbefore set forth, has the general formula:

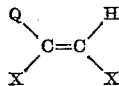

Q and X representing radicals hereinbefore set forth may include 1,2-dichloroethylene, 1,2-dibromoethylene, 1,2-difluoroethylene, 1,2-diiodoethylene, 1,1,2-trichloroethylene, 1,1,2-tribromoethylene, 1,1,2-trifluoroethylene, 1,1,2-triiodoethylene, 1,2-dichloro-1-propene, 1,2,3-trichloro-1-propene, 1,2-dibromo-1-propene, 1,2,3-tribromo-1-propene, 1,2-difluoro-1-propene, 1,2,3-trifluoro-1-propene, 1,2-diiodo-1-propene, 1,2,3-triiodo-1-propene, 1,2-dichloro-1-butene, 1,2,4-trichloro-1-butene, 1,2-dibromo-1-butene, 1,2,4-tribromo-1-butene, 1,2-difluoro-1-butene, 1,2,4-trifluoro-1-butene, 1,2-diiodo-1-butene, 1,2,4-triiodo-1-butene, 1,2-dichloro-1-pentene, 1,2-dibromo-1-pentene, 1,2,5,5-tetrachloro-1-pentene, 1,2,5,5-tetrabromo-1-pentene, 1,2-difluoro-1-pentene, 1,2,5,5-tetrafluoro-1-pentene, 1,2-diiodo-1-pentene, 1,2,5,5-tetraiodo-1-pentene, etc. It is to be understood that the above enumerated conjugated cycloalkadienes and polyhaloolefins of the aforesaid general formula are only representatives of the compounds which may be used, and that this invention is not necessarily limited thereto.

The dehydrohalogenation of the polyhalobicycloalkenes resulting from the reaction between the conjugated cycloalkadiene and the polyhaloolefin is effected by treating said compounds with a dehydrohalogenating agent which includes the hydroxides of the alkali metals and alkaline earth metals such as the hydroxides of lithium, sodium, potassium, rubidium, cesium, calcium, barium and strontium; amines such as trimethylamine, pyridine, quinoline, etc.; alkali metal alkoxides such as sodium methoxide, potassium ethoxide, etc.; and other basic substances such as potassium carbonate, potassium phenoxide, etc. The hydroxides of the alkali metals and alkaline earth metals may be used as such (fused or powdered) or they may be dissolved in a suitable organic solvent preferably an alcohol. The particular alcohol which is used as the organic solvent in the dehydrohalogenating reaction will depend largely upon the temperature at which the reaction occurs. Alcohols which are utilizable in this reaction include methyl, ethyl, n-propyl, isopropyl, n-butyl, isobutyl, amyl, etc.

The operating conditions under which the process of the present invention is conducted will, to some extent, depend upon the particular compounds employed in the reaction. The temperature for the reaction between the particular conjugated cycloalkadiene and the polyhaloolefin in which a polyhalobicycloalkene is formed will range from about atmospheric to about 250° C. or more, the preferred range being from about 100° to about 200° C. Likewise, the dehydrohalogenation step of this process will also occur at temperatures depending upon the particular reactants and the solvent which is used as a medium for the reaction. Suitable temperatures will usually lie in the range of from about 50° to about 250° C., the preferred range being from about 75° to about 200° C. In addition, the reaction will usually take place at atmospheric pressure; however, when the reaction temperature is in a higher range than the boiling point of the solvent, superatmospheric pressures may be employed.

The process of this invention may be effected in any suitable manner and may comprise either a batch or a continuous type operation. When a batch type operation is used, a quantity of the reactants comprising the conjugated cycloalkadiene and the polyhaloolefin is placed in a reactor provided with a mixing and heating device. The reactor is heated to the desired temperature while thoroughly admixing the contents thereof. After a suitable period of time has elapsed, the reactor and its contents are cooled to room temperature, after which the desired product is recovered by suitable means, for example, by fractional distillation or other means known in the art, while the unreacted feed stock may be recharged to form a portion of the starting material of the next batch. The desired product is then placed in a second reactor, or if so desired, returned to the same reactor and the dehydrohalogenating agent (and organic solvent, if used) added thereto. The reactor is then heated to the desired temperature until the reaction is completed, after which the halobicycloalkadiene is separated by suitable means hereinbefore set forth.

Another method of operation of the present process is of the continuous type. In this operation the reactants comprising the conjugated cycloalkadiene and the polyhaloolefin are continuously charged to a reactor provided with heating and mixing means. The reactor may comprise an unpacked vessel or coil or may be lined with an adsorbent packing material such as dehydrated bauxite, alumina and the like, said reactor being maintained at suitable operating conditions of temperature and pressure. The desired reaction product comprising a polyhalobicycloalkene is continuously withdrawn from this vessel by suitable means and charged into a second reactor also maintained at suitable operating conditions, while the unreacted feed stock from the first reactor may be withdrawn and recycled for use as a part of the fresh feed stock. The dehydrohalogenating agent, comprising for example, an alkali or alkaline earth hydroxide, either in solid or fluidized form or dissolved in the solvent which acts as a medium in which the dehydrohalogenation takes place are also charged to the aforesaid second reactor by suitable means. The dehydrohalogenated compound, comprising a halobicycloalkadiene, is continuously withdrawn from this second reactor and purified by conventional means hereinbefore set forth, while the unreacted material may be recycled to form a portion of the feed stock.

As hereinbefore set forth the halobicycloalkadienes prepared in the above manner may be reacted with a polyhalocycloalkadiene such as hexachlorocyclopentadiene to form polyhalotetracyclic compounds which are useful as insecticides. The condensation of the halobicycloalkadiene and the hexachlorocyclopentadiene is carried out in a similar manner to the reaction between the conjugated cycloalkadiene and the polyhaloolefin containing at least one halogen atom on each of the doubly bonded carbon atoms as hereinbefore described. The temperature at which the reaction is to be carried out will be in the range of from about atmospheric to about 250° C. or more, the preferred range being from about 60° C. to about 200° C. In addition, the reaction may be effected in any suitable manner, ether a batch or a continuous type operation similar to that hereinbefore described with reference to the reaction between the cycloalkadiene and the polyhaloolefin. In the batch type operation the reactants comprising the hexachlorocyclopentadiene and the halobicycloalkadiene are placed in a reactor provided with heating and mixing devices. This reactor is heated and maintained at the desired temperature until the reaction is completed after which the reactor is cooled to room temperature and the desired reaction product withdrawn, separated and purified by conventional means such as fractional distillation, crystallization, etc.

When a continuous type operation is used the reactants may be introduced into a reactor through lines provided therefore, said reactor being equipped with heating and mixing means and maintained at the desired operating conditions of temperature and pressure. The desired product is withdrawn and purified while the unconverted material may be recycled and used as part of the feed stock, or mixed with fresh starting materials. It is also contemplated within the scope of this invention, that this latter reaction may take place in the presence of inert diluents, e.g. liquid aromatic hydrocarbons such as benzene, toluene, etc.

The present invention is further illustrated with respect to specific embodiments thereof in the following examples which, however, are not intended to limit the generally broad scope of the present invention in strict accordance therewith.

Example I

This example shows the preparation of 2,3-dichlorobicyclo[2.2.1]-2,5-heptadiene by the partial dehalogenation of 5,5,6-trichlorobicyclo[2.2.1]-2-heptene using a dehydrohalogenation agent comprising an alkali metal hydroxide in an alcoholic medium. 91 g. (1.4 mole) of cyclopentadiene and 210 g. (1.6 mole) of 1,1,2-trichloroethylene were placed in a glass liner of a rotating autoclave. The reaction mixture was heated under 30 atmospheres of additional pressure at approximately 180° C. for a period of six hours. At the end of this time the vessel and its contents were cooled to room temperature, the reaction products consisting of 296 g. of an amber liquid. The liquid was taken up in pentane, washed with dilute alkali and water, dried and subjected to fractional distillation. A yield of 83 g. of a material boiling at 85–87° C. at 7.5 mm. pressure was obtained. This material became partially crystalline upon standing, filtration of this product yielding 25 g. of a crystalline material melting at 51° C. and 26 g. of an oil, said oil and crystalline material apparently being stereoisomers. The crystals and oil were subjected to analysis, the results being set forth below.

*Analysis.*—Calculated for $C_7H_7Cl_3$ (5,5,6-trichlorobicyclo[2.2.1]-2-heptene): C, 42.56; H, 3.57; Cl, 53.87. Found for crystalline material: C, 42.91; H, 3.81; Cl, 53.51. Found for oil: C, 44.36; H, 3.91; Cl, 51.75.

A solution of 20 g. of the crystalline 5,5,6-trichlorobicyclo[2.2.1]-2-heptene and 7 g. of potassium hydroxide in 100 cc. of ethanol was heated under reflux at 80° C. for approximately 30 hours. The reaction product was filtered and a clear amber solution recovered therefrom. This amber solution was treated with water, the insoluble portion taken up in pentane and the resulting pentane solution was washed, dried and subjected to fractional distillation. There was obtained 5.5 g. of 2,3-dichlorobicyclo[2.2.1]-2,5-heptadiene boiling at 104–105° C. at 92 mm. or 173–174° C. at 760 mm. pressure.

Example II

Another example showing the dehydrohalogenation of 5,5,6-trichlorobicyclo[2.2.1]-2-heptene using a different solvent as the reaction medium was performed. In this example a solution of 25 g. of 5,5,6-trichlorobicyclo[2.2.1]-2-heptene and 8 g. of potassium hydroxide in 100 cc. of propanol was heated under reflux at a temperature of approximately 90° C. for 16 hours. The reaction product was filtered, yielding a clear amber filtrate and potassium chloride. The clear amber filtrate was treated with water, extracted with pentane and the extract was washed with water, dried and subjected to fractional distillation under reduced pressure. 9.5 g. of 2,3-dichlorobicyclo[2.2.1]-2,5-heptadiene having a boiling point of 69–70° C. at 22 mm. of 173–174° C. at 760 mm. were obtained and subjected to analysis, the results of which appear below.

Calculated for $C_7H_6Cl_2$ (2,3-dichlorobicyclo[2.2.1]-2,5-heptadiene): C, 52.21; H, 3.75; Cl, 44.04. Found: C, 52.43; H, 3.75; Cl, 43.60.

I claim as my invention:

1. A process for the preparation of 2,3-dichlorobicyclo[2.2.1]-2,5-heptadiene which comprises dehydrohalogenating 5,5,6-trichlorobicyclo[2.2.1]-2-heptene, in the presence of potassium hydroxide and propanol at a temperature of from about 75° to about 200° C. to form 2,3-dichlorobicyclo[2.2.1]-2,5-heptadiene, and recovering the latter compound.

2. A process for the preparation of 2,3-dichlorobicyclo[2.2.1]-2,5-heptadiene which comprises dehydrohalogenating 5,5,6-trichlorobicyclo[2.2.1]-2-heptene in the presence of potassium hydroxide and ethanol at a temperature of from about 75° to about 200° C. to form 2,3-dichlorobicyclo[2.2.1]-2,5-heptadiene, and recovering the latter compound.

3. A process for the preparation of 2,3-dichlorobicyclo[2.2.1]-2,5-heptadiene which comprises dehydrohalogenating 5,5,6-trichlorobicyclo[2.2.1]-2-heptene in the presence of an alkali metal hydroxide and an organic solvent at a temperature of from about 75° to about 200° C. to form 2,3-dichlorobicyclo[2.2.1]-2,5-heptadiene, and recovering the latter compound.

4. A process for the preparation of 2,3-dichlorobicyclo[2.2.1]-2,5-heptadiene which comprises dehydrohalogenating 5,5,6-trichlorobicyclo[2.2.1]-2-heptene in the presence of an alkali metal hydroxide and an alcohol at a temperature of from about 75° to about 200° C. to form 2,3-dichlorobicyclo[2.2.1]-2,5-heptadiene, and recovering the latter compound.

References Cited in the file of this patent

UNITED STATES PATENTS

| | | |
|---|---|---|
| 2,351,311 | Alder | June 13, 1944 |
| 2,717,851 | Lidov | Sept. 13, 1955 |